United States Patent [19]
Murano

[11] Patent Number: 5,671,002
[45] Date of Patent: Sep. 23, 1997

[54] PRINT HEAD WITH MULTIPLEXED RESISTANCES CONTROLLING SUPPLY OF CURRENT TO IMAGE BLOCKS

[75] Inventor: Shunji Murano, Aira-gun, Japan

[73] Assignee: Kyocera Corporation, Kyoto, Japan

[21] Appl. No.: 674,590

[22] Filed: Jun. 27, 1996

Related U.S. Application Data

[63] Continuation of Ser. No. 10,660, Jan. 28, 1993, abandoned.

[30] Foreign Application Priority Data

| Jan. 31, 1992 | [JP] | Japan | 4-046057 |
| Jan. 31, 1992 | [JP] | Japan | 4-046058 |
| Feb. 14, 1992 | [JP] | Japan | 4-061218 |

[51] Int. Cl.$^6$ .............. B41J 2/47; B41J 29/38; B41J 2/355; H04N 1/23
[52] U.S. Cl. ............ 347/237; 347/240; 347/13; 347/182; 347/183; 347/188; 358/296; 358/298
[58] Field of Search ............... 347/237, 238, 347/225, 224, 240, 233, 143, 145, 133, 131, 130, 129, 182, 12, 13, 188, 183, 15; 358/296, 298, 300, 302; 345/55, 82, 204

[56] References Cited

U.S. PATENT DOCUMENTS

| 4,074,318 | 2/1978 | Kapes, Jr. ............... 358/302 X |
| 4,689,694 | 8/1987 | Yoshida ................... 358/298 |
| 4,706,130 | 11/1987 | Yamakawa ............... 358/296 |
| 4,764,778 | 8/1988 | Spektor et al. ........... 347/255 |
| 4,814,886 | 3/1989 | Kuge et al. ............... 358/298 X |
| 4,928,118 | 5/1990 | Leksell et al. ........... 358/296 X |
| 5,062,002 | 10/1991 | Dahlquist et al. ....... 358/298 |
| 5,062,115 | 10/1991 | Thornton ................. 372/50 |
| 5,099,192 | 3/1992 | Thayer et al. ........... 347/237 X |
| 5,150,016 | 9/1992 | Sawase . |

FOREIGN PATENT DOCUMENTS

| 2-43634 | 10/1990 | Japan . |
| 2-253973 | 10/1990 | Japan . |
| 4-276466 | 10/1992 | Japan ................... 347/237 |

*Primary Examiner*—David F. Yockey
*Attorney, Agent, or Firm*—Loeb & Loeb LLP

[57] ABSTRACT

In an LED head operated on a time sharing basis, a multiplexer switches resistances for determining LED currents on LED arrays and assigns appropriate resistance to each array. The multiplexer is operated by block select signals of a block select circuit for time sharing operation, where the number of resistances corresponds to the number of blocks. The multiplexer capacity may also be less than the number of blocks, where the number of resistances less than the number of blocks and the same resistances correspond to more than one block. Output dispersions between arrays are adjusted by appropriate assignment of the resistances. sharing operation. Capacity of the multiplexer correspond to the number of blocks required for time. Gray scale printing is achieved by switching the current determining resistances in accordance with shading degree of image with the multiplexer.

14 Claims, 16 Drawing Sheets

PRINT HEAD WITH MULTIPLEXED RESISTANCES CONTROLLING SUPPLY OF CURRENT TO IMAGE BLOCKS

This is continuation of application Ser. No. 08/010,660 filed on Jan. 28, 1993, now abandoned.

FIELD OF THE INVENTION

The present invention relates to print heads such as light emitting diode (LED) heads, thermal heads, electro luminescence (EL) heads, liquid crystal shutter array heads, and PLZT heads which utilize, in particular, a multiplexer in order to adjust the output dispersions of image arrays or to implement gray scale printing.

PRIOR ART

A print head is a device to expose a light sensitive medium or to heat ink ribbons by activating a large number of image formation modules with operating circuits. Image formation modules are usually integrated as an array which often works as a unit to conduct a time-sharing operation in a print head. In this context, an array of image formation modules is called as an image block. It is also possible to use two image arrays as an image block.

As far as print heads are concerned, printing quality is influenced by the output dispersions of image formation modules. Although dispersions are small within an array, those of inter-array are relatively large. One widely known technique to adjust the output dispersions is to vary the time length of strobe signals sent to arrays. However, with the printers performing higher speed operation, it is becoming harder to adjust the time length of strobe signals. For example, when a line is scanned in 1.3 msec and 2560 image formation modules are operated in 40 divisions for each line, the operating time for one image block is around 30 μsec. To adjust the output dispersion of every array with the accuracy of ±3%, it is required to vary the operating time with the accuracy of 1 μsec. In order to achieve this by strobe signals, the time length of a strobe signal has to be controlled with the accuracy of approximately 1 μsec for every image array. This is extremely difficult.

Printing ratio is defined as a ratio of image formation modules which generate printing output out of all image formation modules in an image array. When a printing ratio increases, both load on an operating circuit and a wiring resistance increase, resulting output decrease of image formation modules. Thus, it is necessary to keep the output of image formation modules stable even when the printing ratio varies.

It is preferable that print heads are capable of gray scale printing. A technique widely known for gray scale printing is to vary strobe time for each image formation module. However, it requires complicated operating circuits.

SUMMARY OF THE INVENTION

An object of the present invention is to provide a new technique to adjust the output dispersions among image arrays especially in a simple manner with simple circuits.

Another object of the present invention is to prevent the fluctuation of output from image formation modules caused by various printing ratios.

Still another object of the present invention is to provide a new technique for gray scale printing.

In the present invention, an operating signal is adjusted to be the optimum value for each corresponding image block by switching current determining resistances to be connected to the operating circuit. Accordingly, the strobe time control for each image block is not necessary. A multiplexer, for example, can be used for switching the current determining resistances. Those resistances are to be provided individually for each image block and the multiplexer scans them one after another. Instead of having individual resistance for each block, however, a common resistance can be applied to all the normal blocks. In such a case, only for image arrays with large dispersions (hereinafter referred as 'abnormal blocks'), a current determining resistance specific to each of them is to be provided. In any case, those abnormal blocks constitute only a small part of total arrays.

According to the present invention, a multiplexer switches the size of operating signals of operating signal generating circuits. That is, a printing line is first divided into several sub-lines, and the multiplexer switches the size of operating signal for each of them in order to implement gray scale printing. For example, printing of 16 gray scales can be achieved by using 4 sub-lines and assigning the size of operating signal for each of them with binary codes. Operating signals will be current signals for the current-operated print heads such as LED heads and thermal heads. And they will be voltage signals for voltage-operated print heads such as liquid crystal shutter array heads.

Figure 14:
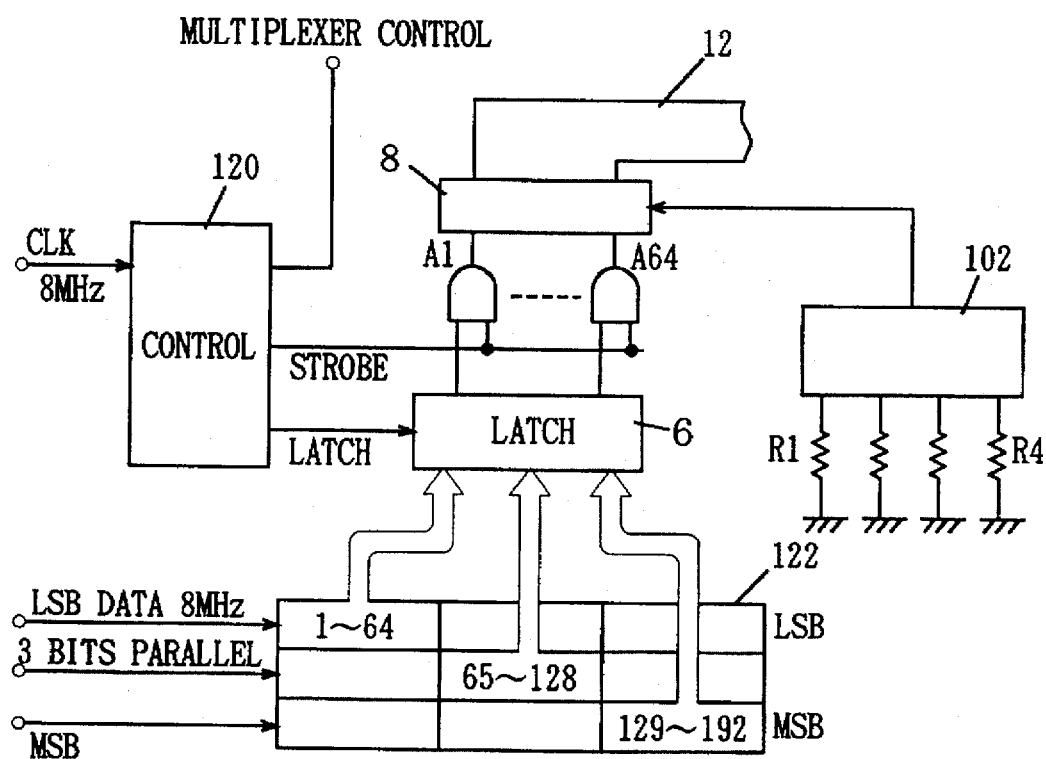
FIG. 14 is a block diagram of a main part of an LED head in which each sub-line of the embodiment shown in FIG. 10 is further divided into 3 micro lines in order to get higher degree of gray scale.
Figure 15:
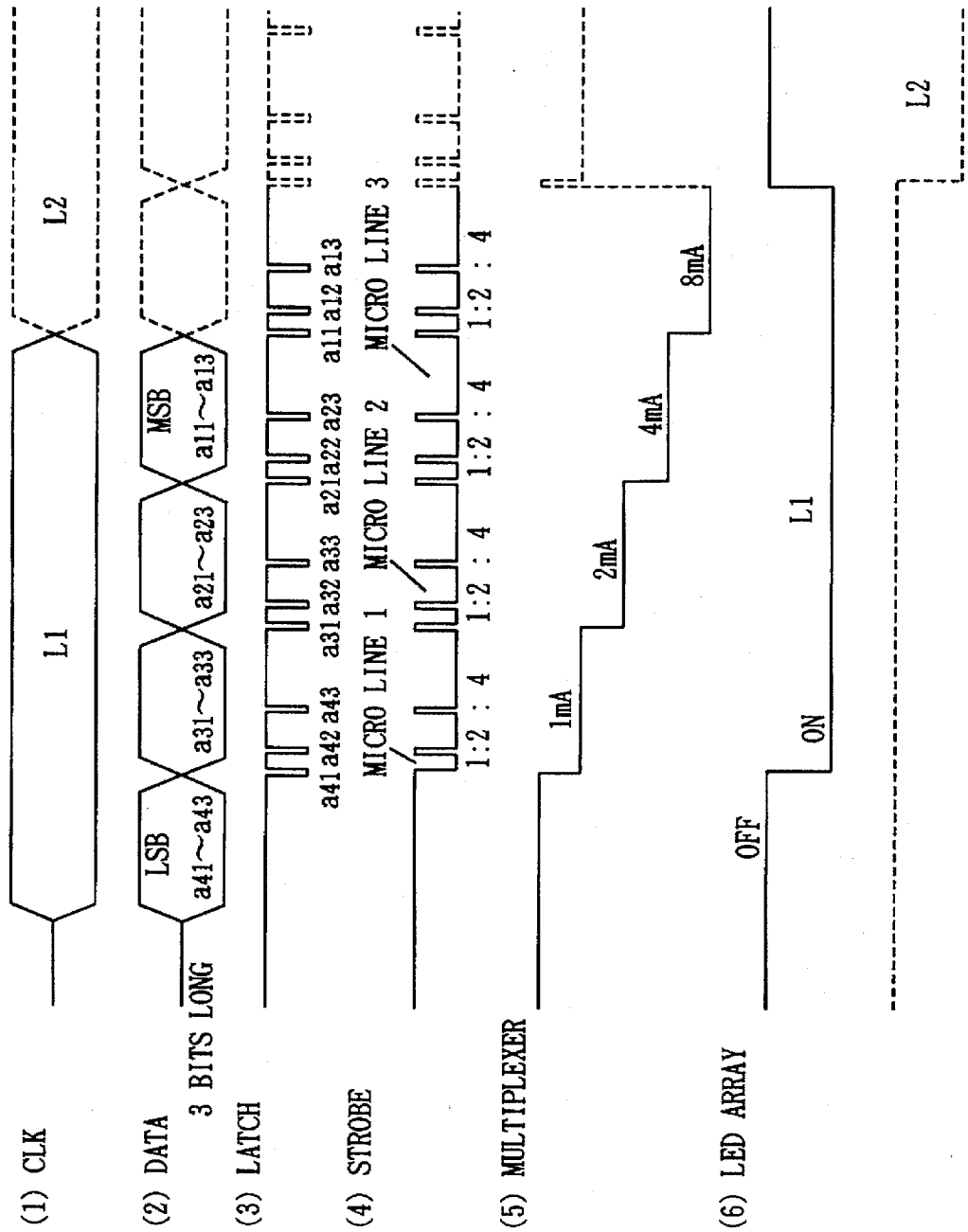

FIG. 15 is an operating waveform diagram of the embodiment shown in FIG. 14.

Figure 16:
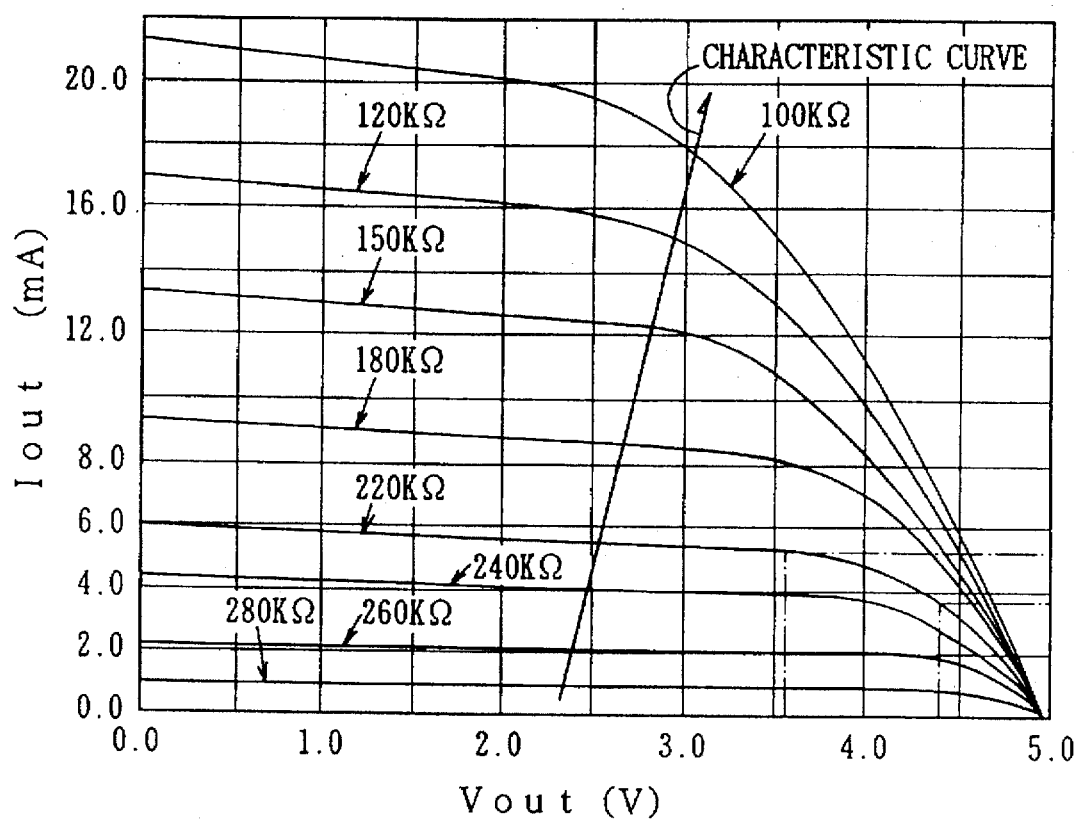

FIG. 16 is a characteristic diagram showing the relationship between current determining resistances and LED current.

Figure 17:
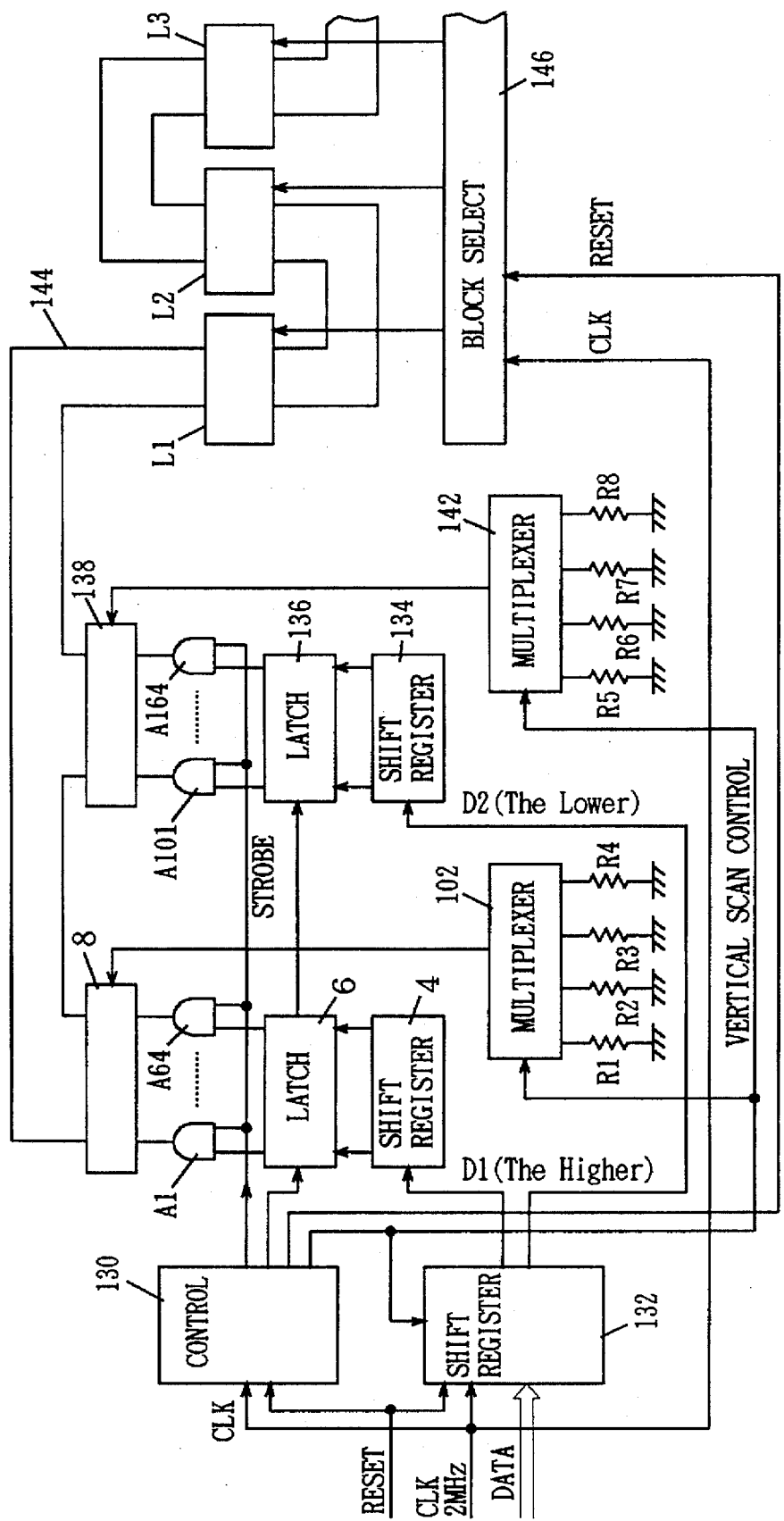

FIG. 17 is a block diagram of an LED head which increases the degree of gray scale by combining outputs of two constant current power supplies.

Figure 18:
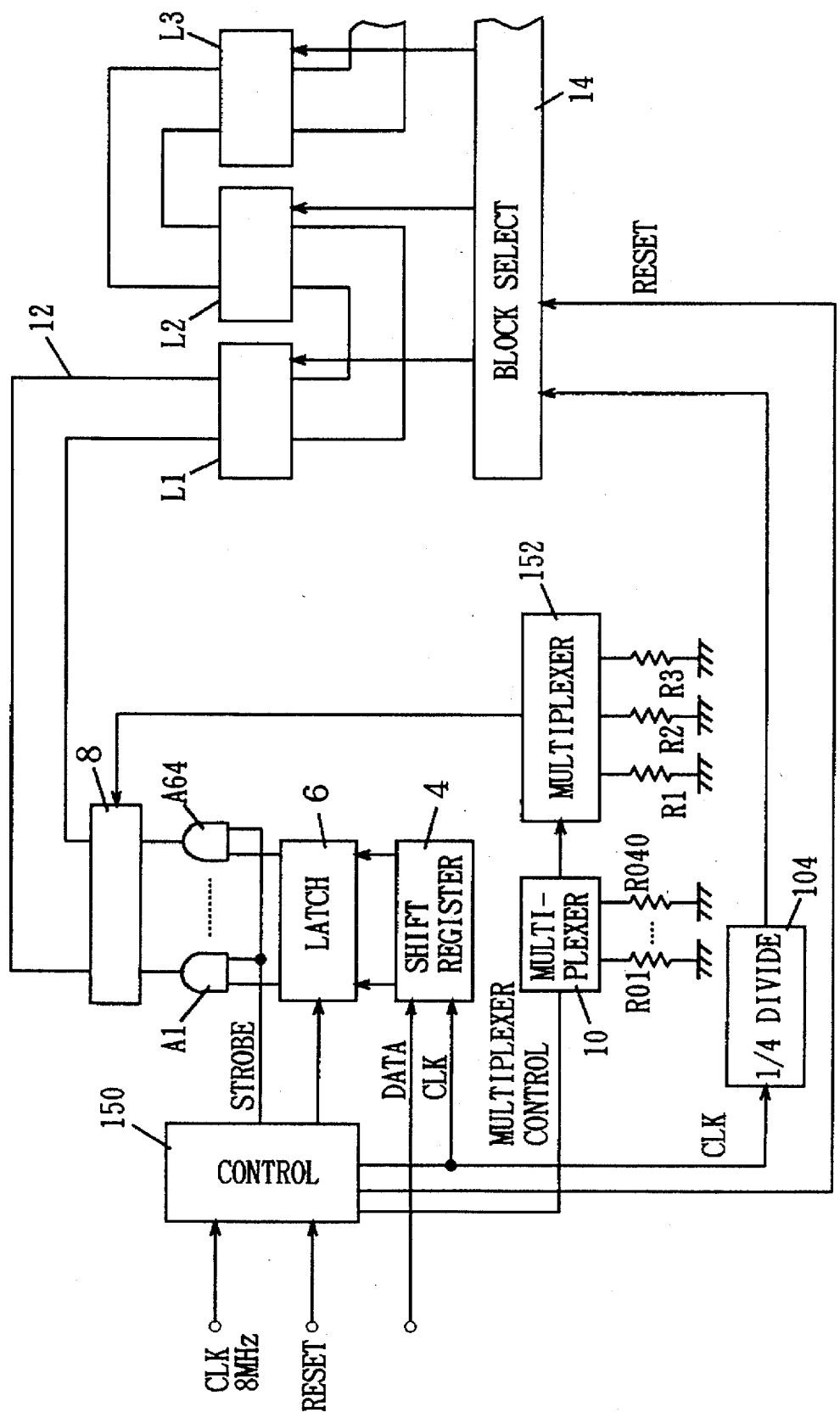

FIG. 18 is a block diagram of an LED head which adjusts the output dispersions of arrays and implements gray scale printing by utilizing two multiplexers.

[Embodiment 1]

Figure 1:
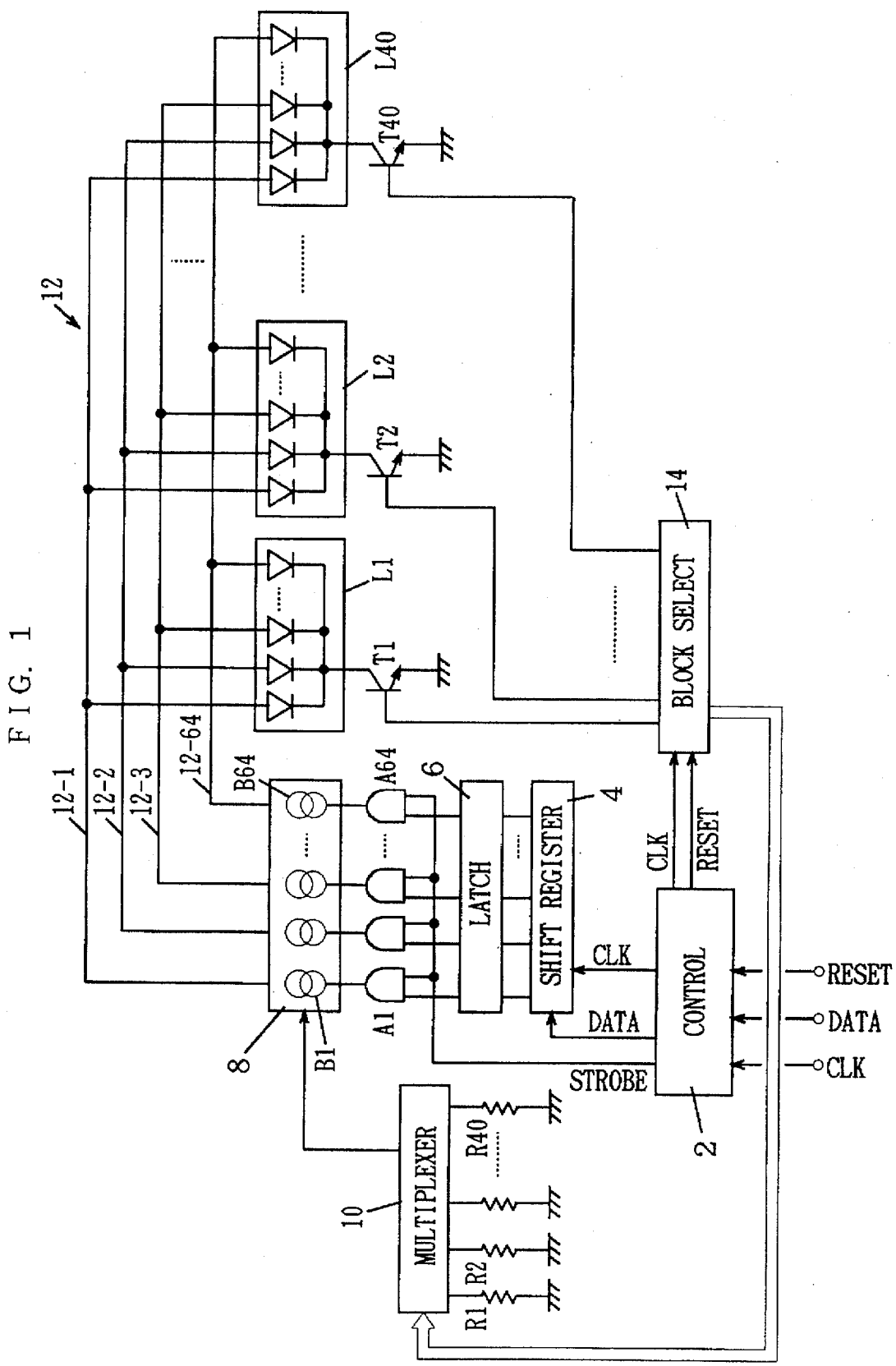
FIG. 1 is a block diagram of an LED head in which a multiplexer scans current determining resistances in order to adjust the output dispersions of inter-array.

FIG. 1 shows a circuit structure of the embodiment. 2 in the figure is a control circuit which receives image signals (print data), clock pulses and reset signals from a printer, more specifically, for example, from a CPU of a printer and controls the LED head. 4 is, for example, a 64 bit shift register and 6 is, for example, a 64 bit latch circuit of 64th. A1 through A64 are 64 AND gates. 8 is a constant current power supply which consists of 64 circuits B1 through B64 with, for example, the constant current of 5 mA. Shift register 4, latch 6, gates A1 to A64 and power supply 8 together constitute a driving circuit for driving the LED head, one block at a time.

Current outputs of the power supply 8 vary according to the external current determining resistances. In the embodiment, 40 resistances from R1 to R40 are employed. Mirror constant current circuits, for example, can be used in the power supply 8 and each circuit of B1 through B64 is set to output the same amount of current as that of the current determining resistance. The power supply 8 can be replaced by a constant voltage power supply. 10 is a multiplexer. 40 FET switches are applied in the multiplexer 10 to select one of the 40 resistances R1 to R40. The selected resistance is used as the current determining resistance for the power supply 8.

12 is bus lines which consist of 64 lines of 12-1 through 12-64. L1 through L40 are 40 LED arrays in each one of which 64 LEDs are integrated. In the embodiment, one LED array is used as an image block. However, two arrays may also be used as an image block. T1 through T40 are switching transistors. 14 is a block select circuit.

Figure 2:
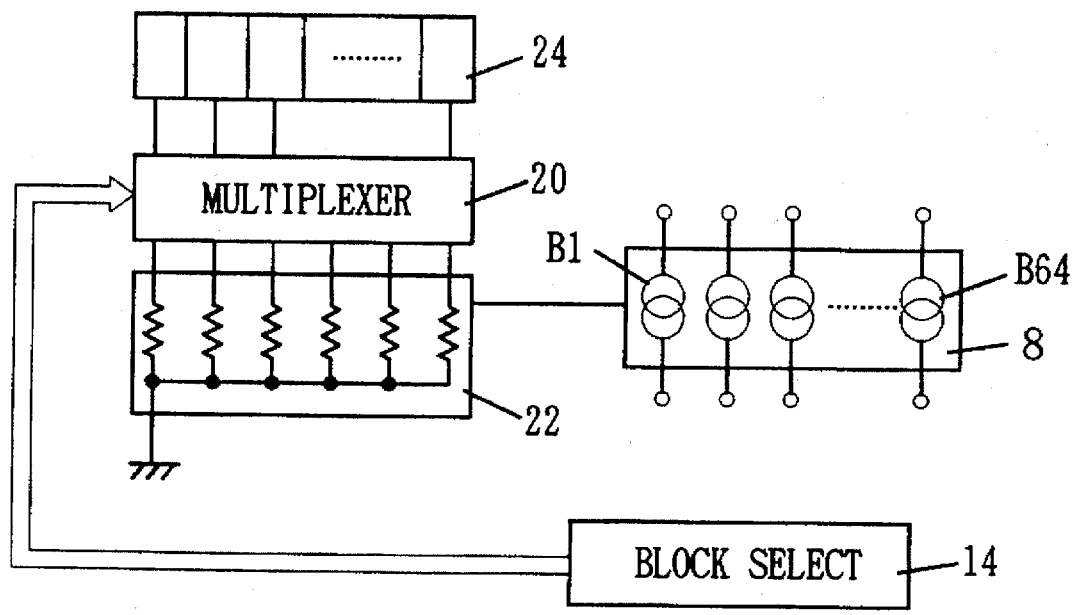
FIG. 2 is a circuit diagram of a main part of an LED head variation of the embodiment shown in FIG. 1.

FIG. 2 shows a variation of the multiplexer. 20 in the figure is a new multiplexer. 22 is, for example, a resistance ladder circuit of 6 bits accuracy. 24 is a memory such as EPROM which stores the adjustment data of LED current of each LED array L1 to L40 individually with, for example, 6 bits accuracy. Then the memory reads out the adjustment data unique to each image block (one of the 40 LED arrays L1 to L40) which is selected by a signal of the block select circuit 14. The signal from block select circuit 14 controls the operation of multiplexer 20. According to the adjustment data, the multiplexer 20 controls resistance outputs of the resistance ladder circuit 22 with 6 bits accuracy. As a result, current outputs of the power supply 8 are controlled with 6 bits accuracy (±1.5%) and LED currents to the LED arrays L1 through L40 are controlled with ±1.5% accuracy.

A variation shown in FIG. 2 is identical to the embodiment shown in FIG. 1 except the multiplexer 20. The difference between the variation in FIG. 2 and the embodiment in FIG. 1 is that the resistance ladder circuit 22 and the memory 24 for adjustment data are required in the case of the variation, while in the embodiment, the multiplexer 10 alone is capable of scanning 40 resistances from R1 to R40 one after another with image block select signals of the block select circuit 14. Furthermore, the multiplexer 20 in FIG. 2 is more complex than the one in FIG. 1. The reason is that the multiplexer 20 requires at least 6 switches to activate the 6 bits resistance ladder circuit 22. These 6 switches are controlled by 40 data retrieved from the EPROM 24.

Now, the operation of the embodiment will be described with reference to FIG. 1. Clock pulses CLK and print data DATA are transferred serially from the printer with the frequency of, for example, 2 MHz. The control circuit 2 transfers them to the shift register 4 of 64th. On the receipt of clock pulses CLK, the shift register 4 recognizes them as shift clocks and shifts the data to store them in a specific address. When all the 64 data are registered in the shift register 4, they are transferred to the latch circuit 6 and wait there for, for example, two clocks. Subsequently, strobe signals of the width of 62 clocks are sent to the AND gates A1 through A64. Then, LED current is sent to the bus lines 12 from the constant current circuit B1 through B64.

The block select circuit 14 consists of, for example, a 64 bit counter, a 64 bit decoder, AND gates and a shift register of 1+40th. The top bit of the shift register is a special bit for bit-set. A reset signal is used for setting a data bit in the top bit. Every time the counter counts 64 clocks, it generates a shift clock and shifts a data bit of the shift register one by one. On the completion of printing a line, the data bit is returned to the second bit which corresponds to the array L1. As a result, bit-set of the data is completed in the way that data for each array respectively correspond to the transistor T1 to T40 to be operated. Signals of the counter are decoded by the decoder. The AND gates activate the signals of the data bits of the shift register during the 1st clock and the 62nd clock out of 64 clocks and the transistors T1 to T40 are operated.

The LED arrays are operated by LED currents from the power supply 8, and also by the operating signals of the corresponding transistors among T1 through T40 sent from the block select circuit 14. Operating frequency of 1 line is, for example, 1.3 msec and time allocation for one image block (one LED array) is, for example, 32 μsec in which LED time is 31 μsec.

There are output dispersions within the range of, for example, approximately ±25% in LED arrays L1 to L40. In this context, an abnormal LED array is defined as an LED array having about 25% more or less output than the median. To secure high quality printing, it is necessary to hold the output dispersion of each array less than ±5%, or more preferably, less than ±3%. The influence of dispersions is remarkable in printing picture images and dispersions between adjoining arrays are also quite noticeable. However, supposing that LED arrays L1 to L40 are selected so that the dispersions can be eliminated, defect rate of LED arrays increases, and thus the cost of LED head increases.

In the embodiment, LED outputs of the LED arrays L1 through L40 are measured at the occasion of assembly of LED head so that the average output of each array can be calculated. Thin plate resistances, for example, can be used for the resistances R1 through R40. In order to adjust the output dispersions of LED arrays L1 through L40, resistance values are trimmed by means such as a laser. As current output of the constant current power supply 8 decreases in inverse proportion to the value of current determining resistance, the resistance value is to be trimmed in the way that the resistances of smaller value are to be applied to the LED arrays of smaller outputs and the resistances of larger value are to be applied to the LED arrays of larger outputs.

When the above mentioned LED head is operated, signals of the block select circuit 14 are sent to the multiplexer 10 and make it turn on the internal 40 switches one by one. The resistances R1 to R40 are used as the current determining resistances of the power supply 8. As a result, the resistance R1 becomes the current determining resistance for the LED array L1, the resistance R2 for the LED array L2 . . . , the resistance R40 for the LED array L40. Thus, even the parallel allocation of 40 switches alone can be used as the multiplexer 10. In such a case, signals from the block select circuit 14 scan these 40 switches in due order.

Figure 3:
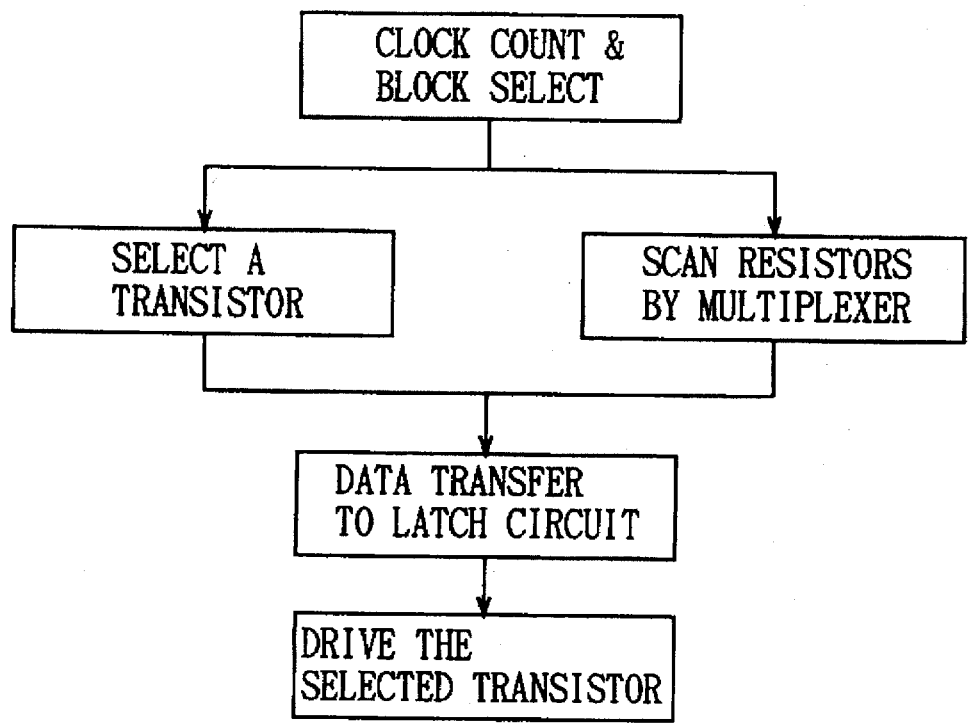
FIG. 3 is an operating flow chart of the embodiment shown in FIG. 1.

FIG. 3 is a control flow illustrating the control upon the power supply 8 by the multiplexer 10. In response to the signals of block select circuit 14, transistors T1 through T40 are operated one after another. AT the same time, the multiplexer 10 is also operated and it starts to scan the current determining resistances from R1 to R40 in order.

Figure 4:
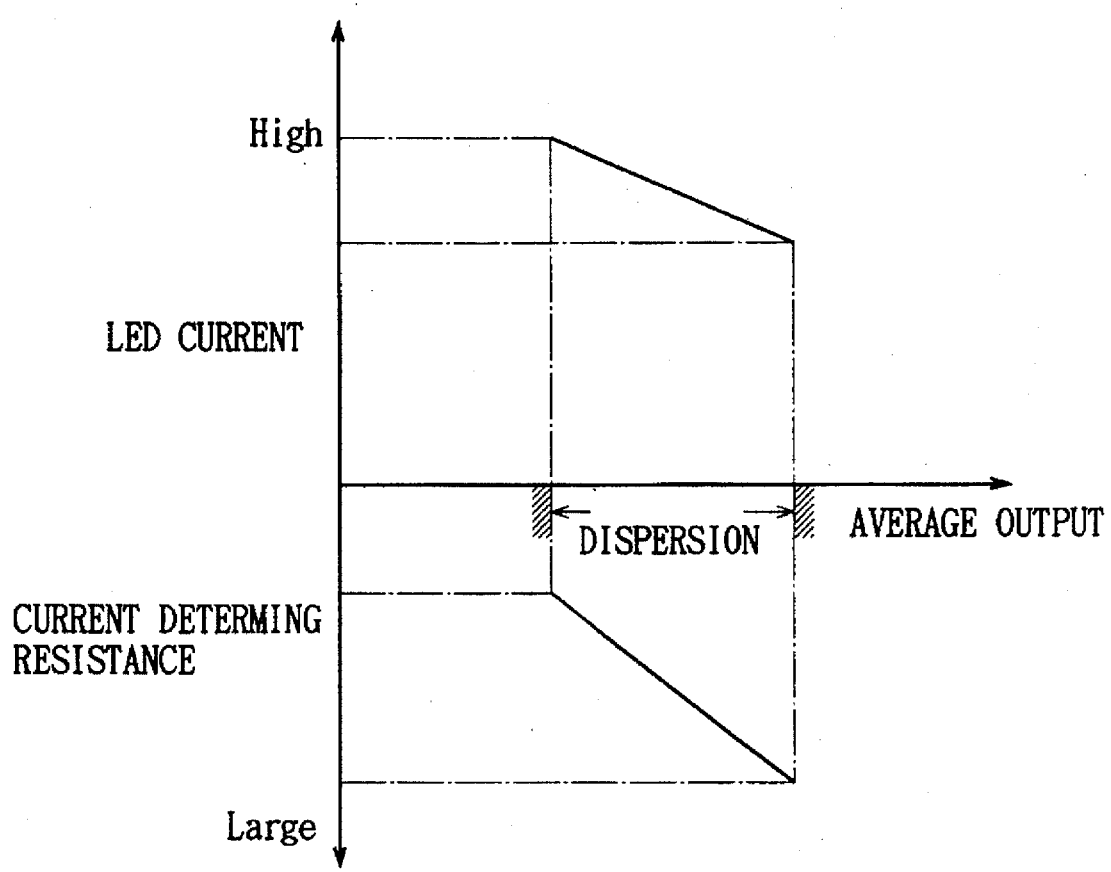
FIG. 4 is a diagram demonstrating operating characteristics of the embodiment shown in FIG. 1.

FIG. 4 shows the principle of adjustment in the output dispersion of LED arrays L1 through L40. The larger the output of a LED array is, the larger the value of resistance to be applied becomes and the smaller the output of a LED array is, the smaller the value of resistance to be applied becomes. The outputs of the constant current circuits B1 through B64 are not determined individually, but are determined in common according to the value of the current determining resistance which is externally connected to the power supply 8. The reason is that the current on the current determining resistance is to be a basic current which is common to all the constant current circuits B1 through B64. As shown in FIG. 4, resistances of smaller value are applied to the arrays of smaller outputs in order to increase the LED current. On the contrary, resistances of larger value are applied to the arrays of larger outputs in order to decrease LED current. Accordingly, the output dispersions of LED arrays L1 through L40 are adjusted. In the case that the structure of the power supply 8 is changed and an individual current determining resistance is employed for each LED, the output dispersion of each LED can be adjusted by mounting a multiplexer 10 for each LED.

The following is the comparison between the embodiment and the prior arts which adjust the dispersions of LED arrays L1 through L40 according to the width of strobe signals. In order to hold the dispersion less than ±3% by means of prior arts, the width of strobe signals has to be adjusted with the accuracy of about 1 μsec (30 μsec×0.03) per every LED array L1 to L40. It also implies that time length of a strobe signal has to be changed with the accuracy of about 2 clocks for each one of the arrays. This is quite difficult in terms of the circuit structure. Control of the strobe time requires a memory with the adjustment data of every array and a decoder to modify the time length of strobe signals. Data in the memory change the operating conditions of the decoder. Because it is necessary to control the time length with about 2 clocks accuracy, the memory and decoder have to be capable of high speed performance. On the other hand, the embodiment shown in FIG. 1, in contrast with the prior arts, requires only the multiplexer 10 which consists of 40 switches and 40 trimmed resistances from R1 to R40. Neither a memory with adjustment data nor high speed decoder is necessary.

Both speed and resolution can easily be improved in the LED head of the embodiment. However, it is not the case in the prior arts which conduct the adjustment by strobe time. Because in the prior arts, for example, if the direction of vertical scan is divided into 4 lines in order to achieve higher resolution, it is necessary to control the strobe time only in 0.25 μsec (1 μsec×¼). On the contrary, as the embodiment employes the multiplexers 10 and 20 to switch resistances for the purpose of adjustment of the output dispersion of LED arrays L1 through L40, the strobe time does not affect to the adjustment operation, no matter how the strobe time is shortened.

[Embodiment 2]

Figure 5:
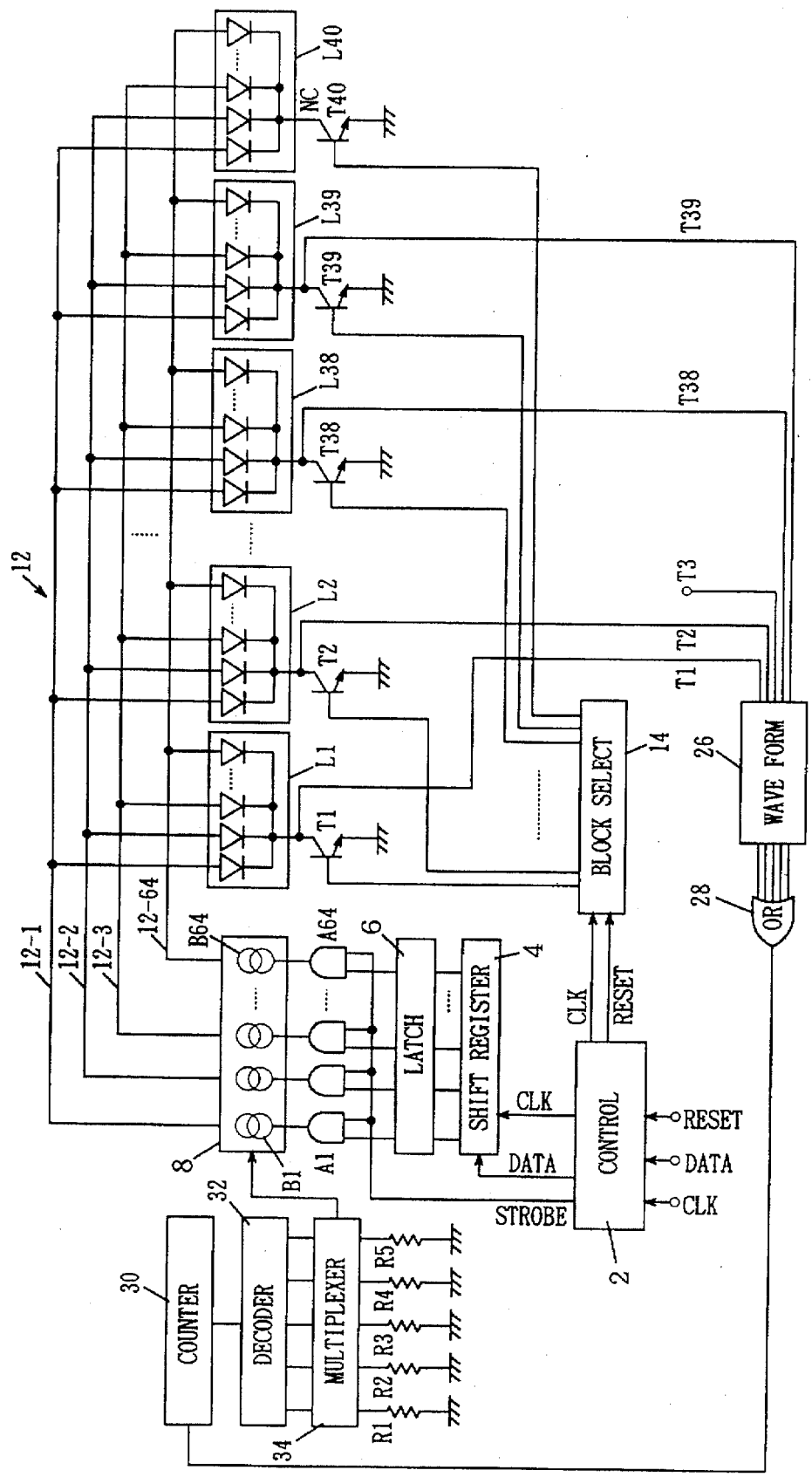
FIG. 5 is a block diagram of an LED head in which a multiplexer switches current determining resistances for the top image block, abnormal blocks and the image blocks next to the abnormal ones.

FIG. 5 shows the second embodiment. 26 in the figure is a waveform shaping circuit. A comparator, for example, can be applied to the circuit 26 to detect that the switching transistor is on and send signals. 28 is an OR gate. 30 is a counter. 32 is a decoder. 34 is a new multiplexer. Reset signals from the printer reset the counter 30. The counter 30 and the decoder 32 can be replaced by a shift register. In such a case, output bits of the shift register are to be shifted one after another in response to the signals of OR gate 28.

The number of abnormal blocks in an LED head is usually from 1 to 3. It is assumed that the outputs of LED arrays L2 and L38 in FIG. 5 exceed the designated range and thus are recognized as being abnormal. All other LED arrays are normal with their outputs within the limit. Then the waveform shaping circuit 26 detects that the corresponding switching transistor such as T1 is on for the top LED array L1, for the abnormal LED array L2, for the next LED array L3, for another abnormal LED array L38 and for the next LED array L39. Any other normal LED arrays are not to be connected to the waveform shaping circuit 26.

When the LED head is reset, the waveform shaping circuit 26 detects that the top LED array L1 is on according to collector-emitter voltage of the switching transistor T1. And the initial value of the counter 30 is set to one via the OR gate 28. The decoder 32 decodes the value and the multiplexer 34 operates the current determining resistance R1 which corresponds to normal LED array L1. These processes are synchronized with the initial stage of the operation of LED array L1. When the abnormal LED array L2 is operated, the counter 30 is incremented by 1 in response to the signal of waveform shaping circuit 26 and the decoder 32 decodes the value of the counter 30, then the next current determining resistance R2 is operated. As for the normal LED array L3 through L37, the counter 30 is incremented by 1 only at the operation of LED array L3 via the waveform shaping circuit 26 and also via the OR gate 28. A common current determining resistance R3 is applied to L3 through L37. When the second abnormal LED array L38 is operated, the counter 30 is incremented by 1 and the current determining resistance R4 is applied. As for the normal LED arrays L39 and L40, the counter 30 is incremented by 1 in response to the signal of the operation of LED array L39 and the last current determining resistance R5 is applied to both of them.

When the number of the abnormal LED arrays is n, the number of necessary current determining resistances is approximately 2n+1. As the number of abnormal LED arrays is unknown until the inspection of the LED head, it is preferable to prepare larger capacity for each component such as the waveform shaping circuit 26, the counter 30, the decoder 32 and the multiplexer 34 (in the embodiment, all those components are able to handle up to 4 abnormal LED arrays, while the number of abnormal arrays are usually from 1 to 3). The excess capacity of, for example, the multiplexer 34 may be used for the connection with the current determining resistance for normal LED arrays. Similarly, the waveform shaping circuit 26 can be individually connected to the switching transistors T1 through T40 by using, for example, jumper lines after the inspection of outputs of LED head. This technique can also be applied in the embodiments shown in FIG. 6 and FIG. 7.

[Embodiment 3]

Figure 6:
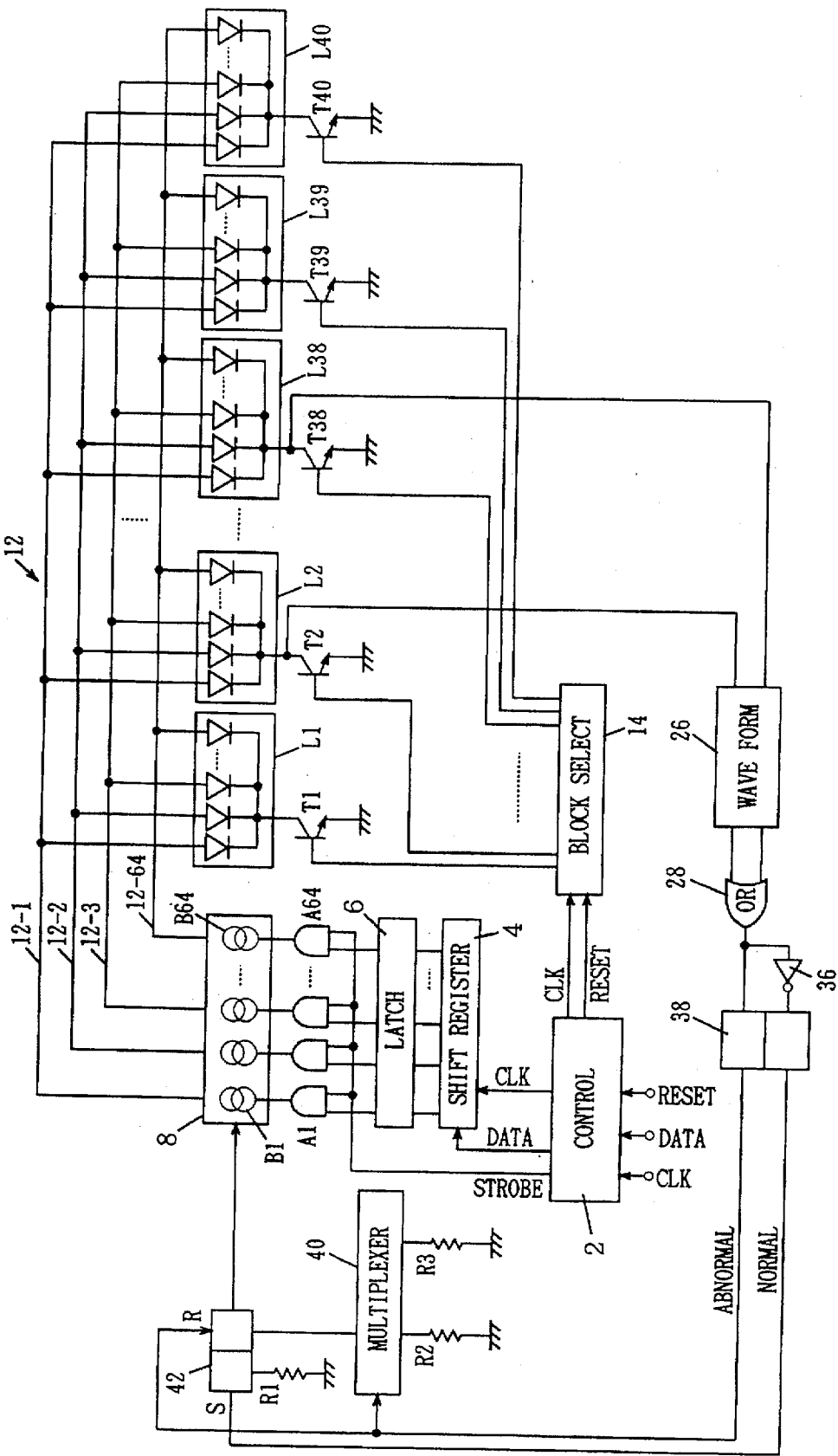
FIG. 6 is a block diagram of an LED head which uses a common current determining resistance for all the normal blocks and uses a multiplexer for scanning only the abnormal blocks.

In the embodiment shown in FIG. 6, the number of current determining resistances is further decreased. R1 in the figure is a current determining resistance for the normal LED arrays, while R2 and R3 are resistances for the abnormal LED arrays L2 and L38. 36 is an inverter. 38 is a one-shot multivibrator. 40 is a multiplexer with a shift register. 42 is a switch circuit which consists of two FETs. When the normal LED arrays such as L1 are operated, S terminal of the switch circuit 42 turns on by a signal of the inverter 36 (normal signal) via the one-shot multivibrator 38. Then, via S terminal, the current determining resistance R1 for the normal LED arrays is connected to the power supply 8. When the first abnormal LED array L2 is operated, R terminal of the switch circuit 42 turns on in response to a signal of the OR gate 28 (abnormal signal) via one-shot multivibrator 38. As a result, the current determining resistance R2 of the multiplexer 40 is connected to the power supply 8. As for the second abnormal LED array L38, an output bit of the shift register in the multiplexer 40 is shifted 1 bit by a signal of the one-shot multivibrator 38 and the current determining resistance R3 is connected. The switch circuit 42, also in this case, connects the power supply 8 to the multiplexer 40.

To sum up the above mentioned, the normal LED arrays are operated by one common current determining resistance R1, while the abnormal LED arrays L2 and L38 are operated by the resistances R2 and R3 respectively. Thus, the number of current determining resistances to be required equals to the number of abnormal LED arrays plus one. In this embodiment, the combination of switch circuit 42 and multiplexer 40 is substantially considered as one multiplexer.

[Embodiment 4]

Figure 7:
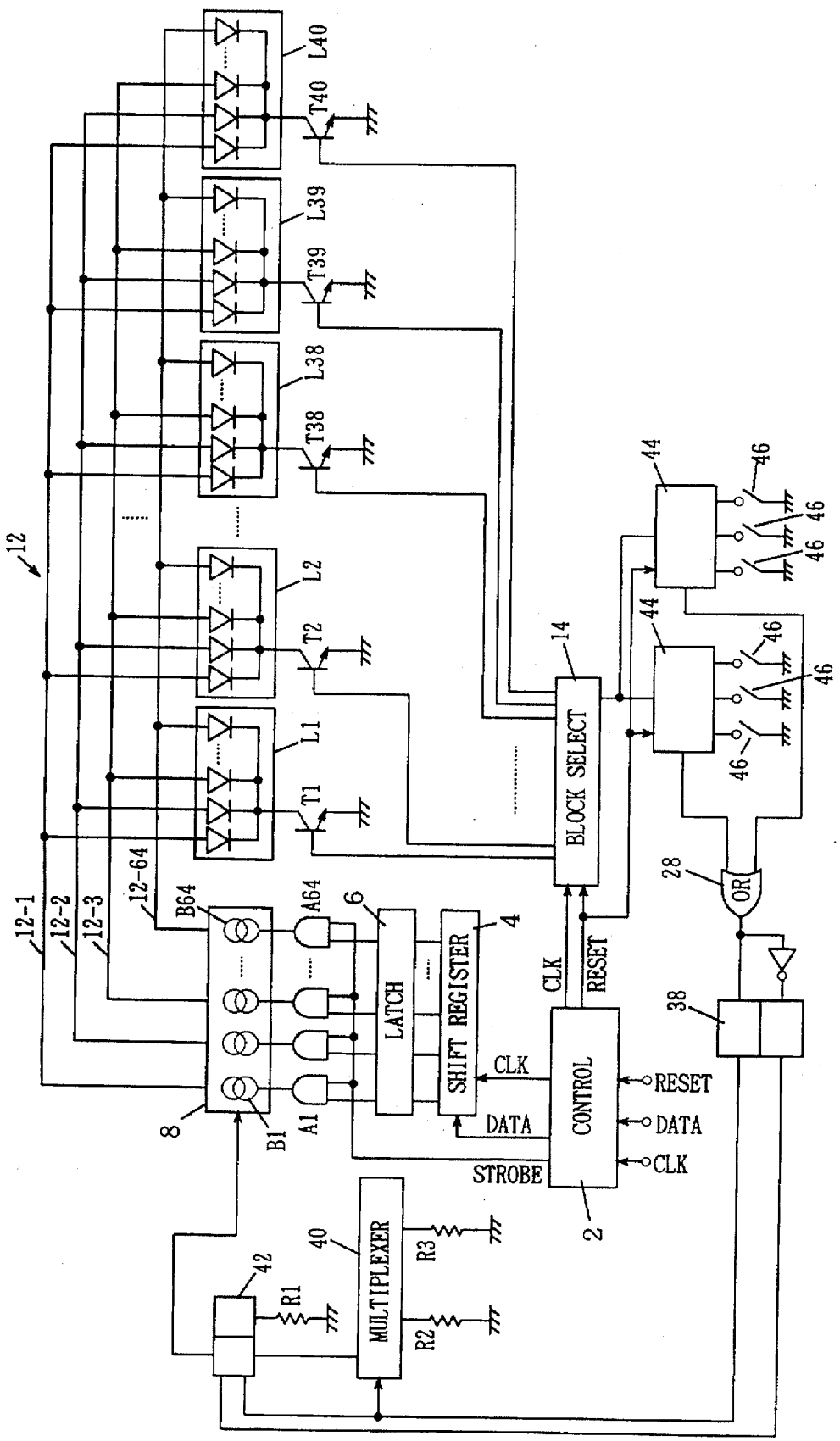
FIG. 7 is a block diagram of a variation of the embodiment shown in FIG. 6. This LED head detects abnormal blocks by a preset counter.

FIG. 7 shows the forth embodiment. 44 in the figure is a presettable counter. 46 is a dip switch which determines set values of the presettable counter 44. In this embodiment, the abnormal LED arrays are detected at the inspection of the LED head and the dip switch 46 accordingly determines the set values of the presettable counter 44. The presettable counter 44 is to be reset by reset signals and is incremented by 1 by a block select signal of the block select circuit 14. When the value of the counter 44 is identical to the predetermined set value, the OR gate 28 generates a signal. In the embodiment, signals are generated for the abnormal LED arrays L2 and L38. Every time an abnormal LED array is selected, the current determining resistance connected to the multiplexer 40 is switched in response to the signal of the one-shop multivibrator 38. When normal LED arrays are operated, the switch circuit 42 connects the current determining resistance R1 with the power supply 8. This embodiment can be implemented without using jumper lines.

[Embodiment 5]

Figure 8:
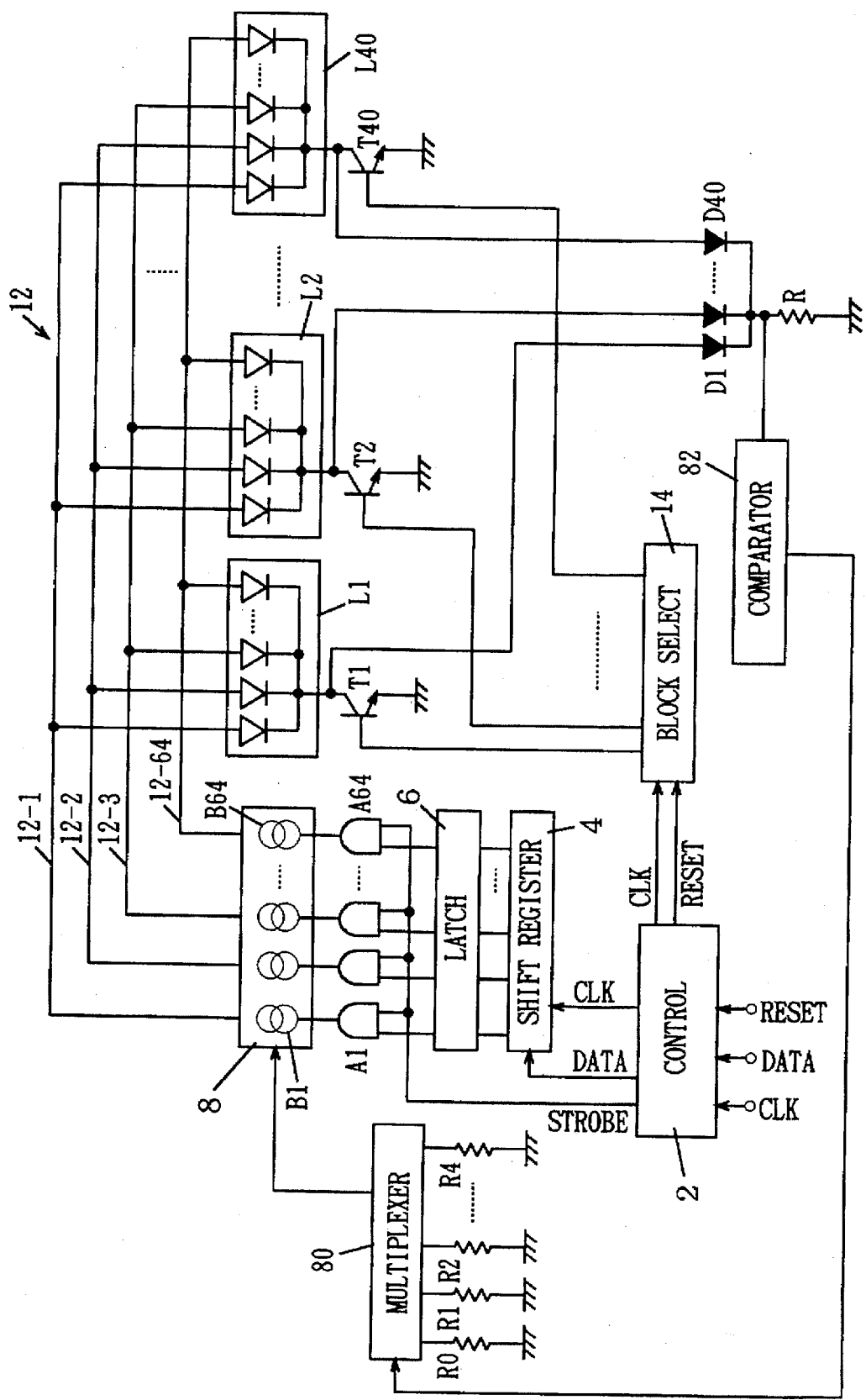
FIG. 8 is a block diagram of an LED head which detects printing ratio by voltages on a switching transistor and switches current determining resistances accordingly.
Figure 9:
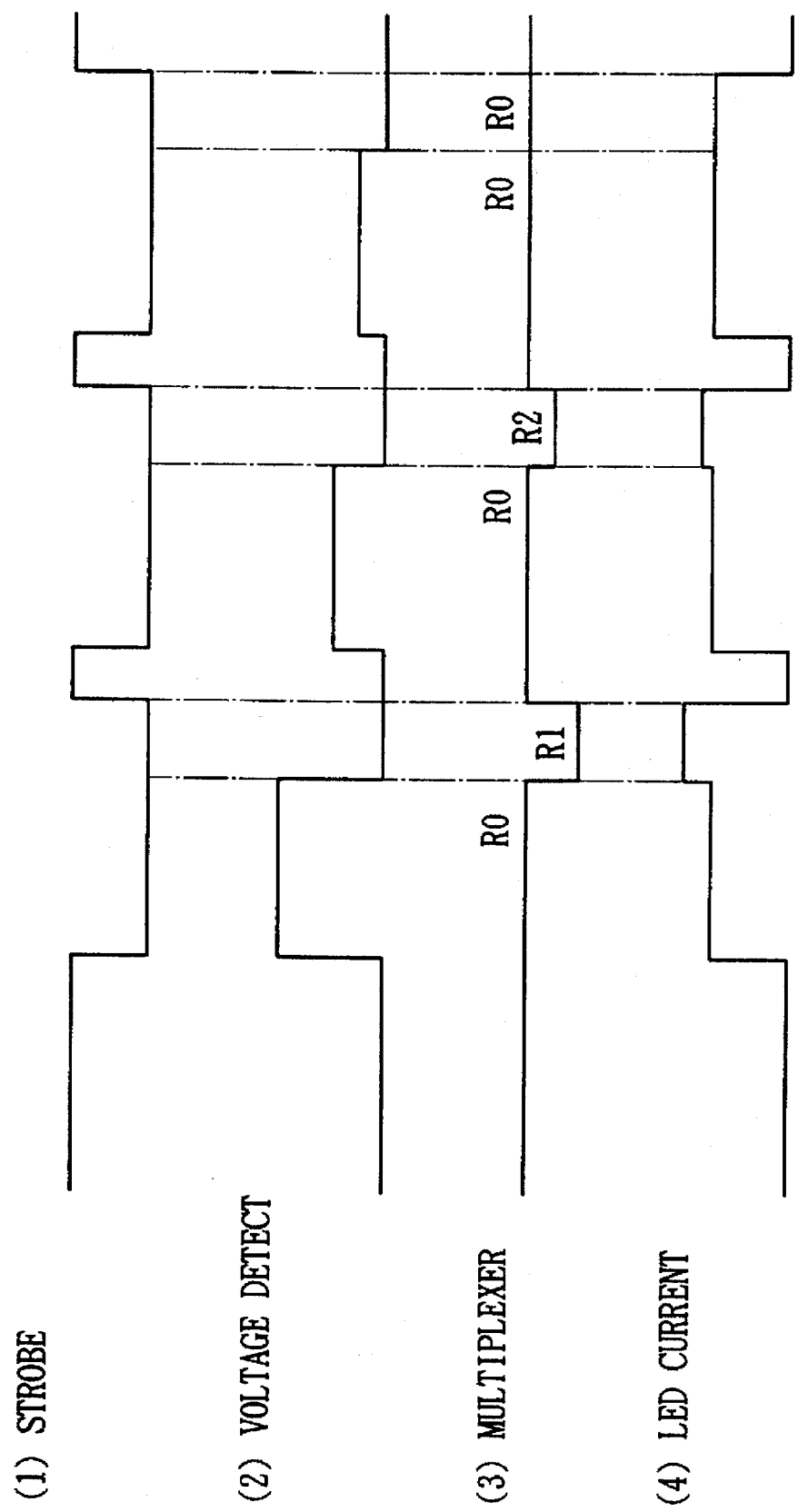
FIG. 9 is an operating waveform diagram of the embodiment shown in FIG. 8.

FIGS. 8 and 9 illustrate the embodiment which detects printing ratio per image block and varies the current determining resistances by a multiplexer in order to adjust the output dispersion. In the following description of the embodiments, the above mentioned symbols represent the same objects. As long as there are no additional explanations nor special remarks, they can be implemented according to the above mentioned embodiments.

82 in FIG. 8 is a comparator. An AD converter, for example, can be applied. 80 is a multiplexer. R0 through R4 are current determining resistances. The LED current from the power supply 8 is determined by the value of one of the current determining resistances of R0 to R4 selected by the multiplexer 80. The LED current iS controlled by switching the resistances R0 to R4 according to the printing ratio.

FIG. 9 shows the operation of the embodiment. The control circuit 2 sends strobe signals with a constant width to AND gates A1 through A64. The comparator 82 detects the voltage on the voltage detecting resistance R in, for example, five stages and controls the multiplexer 80. Then a current determining resistance is selected among five stages of R0 through R4 in, for example, the latter ⅓ of strobe signal time. The current output of the power supply 8 is also varied. That is, the multiplexer 80 controls the current output of the power supply 8 in the latter ⅓ of strobe signal time in order to prevent the fluctuation of exposure energy of an LED caused by various printing ratio.

[Embodiment 6]

FIGS. 10 through 13 show the sixth embodiment. 100 in the figures is a driving signal generating circuit which receives, for example, clock pulses of 8 MHz and reset signals from the printer. The shift register 4 is, for example 64 bits and serially receives print data at 8 MHz. 102 is a new multiplexer which controls the current output of the power supply 8. 4 current determining resistances from R1 to R4 are connected to the multiplexer 102. By switching the 4 resistances R1 to R4 with the multiplexer 102, the current output of the power supply 8 varies in the range, for example, from 1 mA to 8 mA. 14 is the aforementioned block select circuit. A clock pulse of 8 MHz is divided into 2 MHz signals by a divide circuit 104 and the circuit 14 selects LED arrays to be operated per a line.

Figure 11:
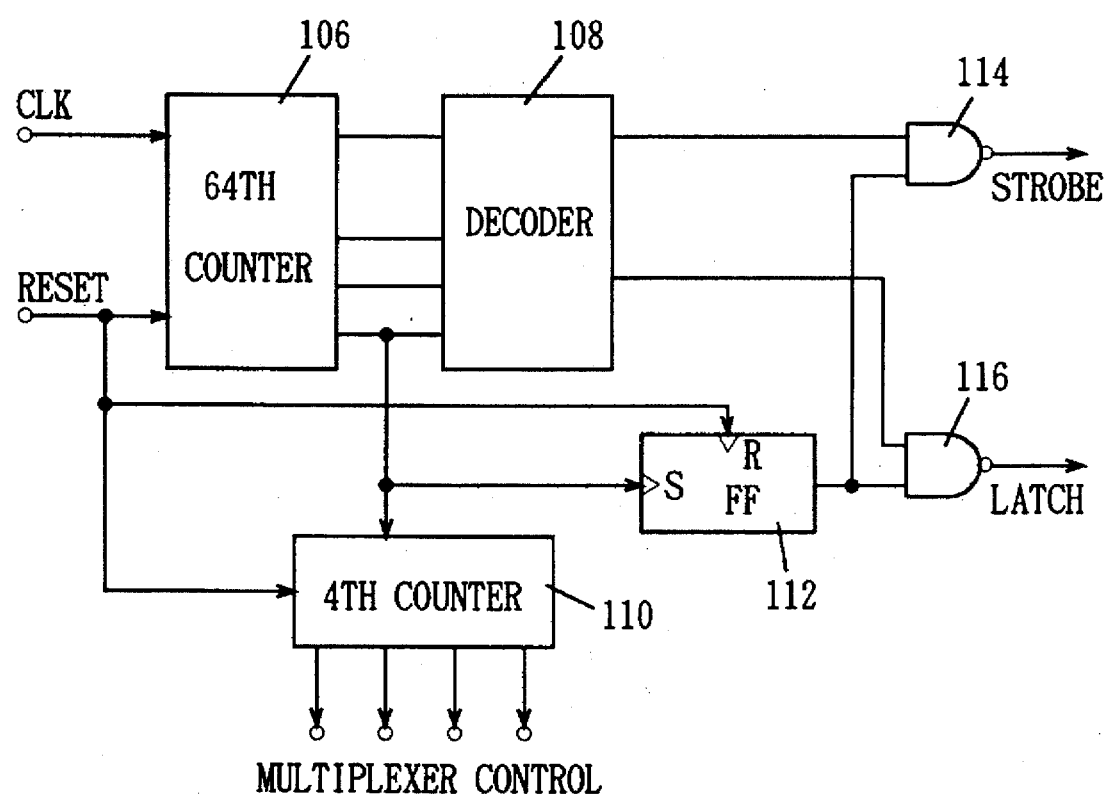
FIG. 11 is a block diagram of the control circuit of the embodiment shown in FIG. 10.

FIG. 11 shows the details of generating circuit 100. 106 in the figure is, for example, a 64 counter. 108 is a decoder. 110 is a 4 bit counter which produces multiplexer control signals, 112 is a flip-flop. Both 114 and 116 are NAND gates.

Now, the operation of the embodiment will be described with reference to FIGS. 10 to 13. First of all, data input from the printer into the LED head will be explained. In order to achieve the printing of 16 gray scales, print data of 4 bits word long are required for each LED. In the printer, among the print data of 4 bits word long, data of the least significant bit (LSB), for example, are first transferred to the head for one array, in the next place, data of the bit weighted 2 are transferred, then data of the bit weighted 4 are transferred. At the end, data of the most significant bit (MSB) weighted 8 are transferred. In the embodiment, the print data of 4 bits word long are divided into 4 sub-lines for the sake of 16 gray scale printing. On sub-line 1, print data of LSB are operated by the LED current of the power supply 8 of, for example, 1 mA each. On sub-line 2, data of the next order are operated by the LED current of, for example, 2 mA each. Accordingly on sub-line 3, data of the third order are operated by the LED current of 4 mA each and on sub-line 4, data of MSB are operated by the LED current of 8 mA each.

Figure 12:
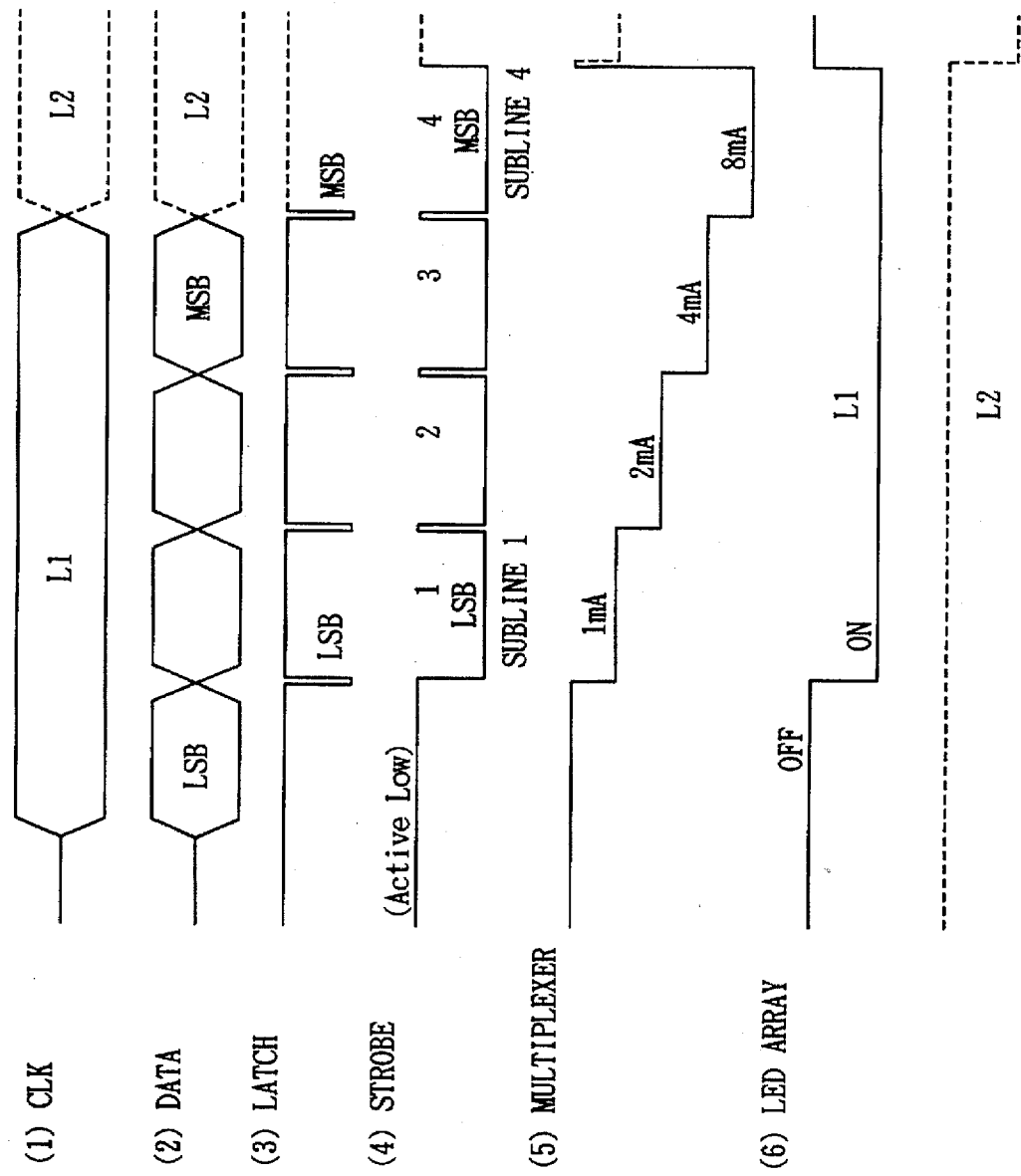
FIG. 12 is an operating waveform diagram of the embodiment shown in FIG. 10.

FIG. 12 shows an operating waveform of the embodiment. In the printer, the gray scale print data of 4 bits are sliced per a bit. The LSB is the first to be input into the LED head, and the MSB is the last to be input into the head. The print data sent to the head per each bit are individually registered by the shift register 4. In the control circuit 100, the counter 106 counts the number of clock pulses and when it counts 64 clocks, the flip-flop 112 is set and the 4 bit counter 110 is incremented by 1. The decoder 108 decodes the output of the counter 106 and for every input of 64 data, the NAND gate 116 is operated and the print data in the shift register 4 are latched to the latch circuit 6. Right after the latching, a strobe signal is generated in the NAND gate 114 by a signal of the decoder 108.

The sub-line 1 is printed by using the LSB of the print data. The sub-line 4 is by the MSB. In other words, print data of 4 bits word long are divided into 4 sub-lines and printed separately according to the weight of each bit in the embodiment. The condition of the multiplexer 102 varies every 64 clock counts of the control circuit 100. Resistance R1 is applied for the sub-line 1, R2 for the sub-line 2, R3 for the sub-line 3 and R4 for the sub-line 4 of the MSB. With the change of the resistances, the LED currents of the constant current circuits B1 to B64 also vary. For example, 1 mA for the sub-line 1, 2 mA for the sub-line 2, 4 mA for the sub-line 3 and 8 mA for the sub-line 4. As a result, the relative value of the accumulation of LED currents on the LED arrays L1 to L40 varies in 16 stages from 0 to 15, and thus the printing of 16 gray scales is achieved. The divide circuit 104 divides a clock pulse into 4 segments and controls the block select circuit 14 which, then, switches the LED arrays L1 to L40 one by one every time the printing of 4 sub-lines 1 though 4 is completed.

In stead of sequentially printing 4 sub-lines for each LED array, it is also possible to print by each sub-line for the 40 LED arrays L1 to L40 allocated in the direction of horizontal scan. That is, only after the sub-line 1 is completed, the sub-line 2 is printed and so on. However, it is not preferable because this method requires a large amount of memory in the printer. In order to scan the 40 LED arrays L1 to L40 serially along the direction of sub-lines, the printer has to be equipped with a memory of about 10K bits (2560×4). Each bit of the memory is required to be sliced and read out. On the contrary, the embodiment shown in FIG. 10 requires relatively small amount of memory for the printer.

Figure 13:
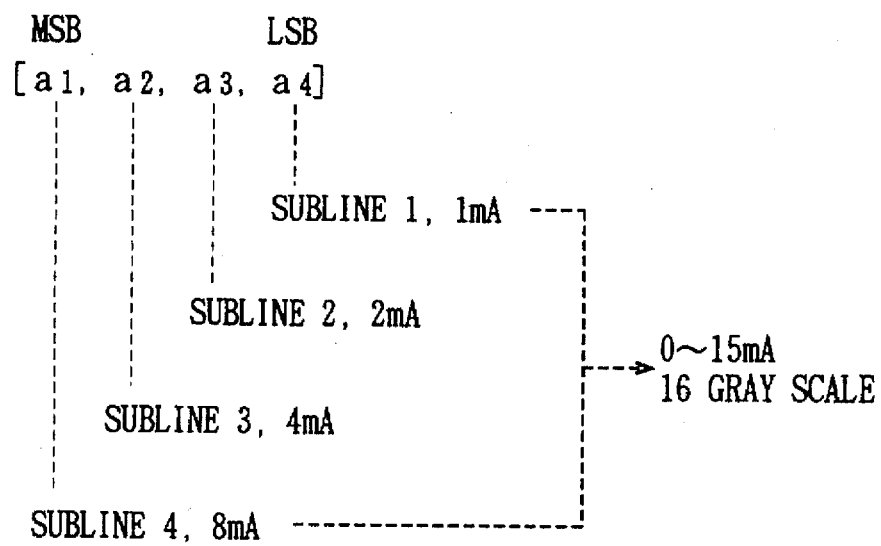
FIG. 13 illustrates a print data structure of the embodiment shown in FIG. 10.

FIG. 13 shows a data structure of the embodiment. 4 bits word long is enough to represent the print data of 16 gray scales. The LSB data a4 are operated on the sub-line 1 by LED current of 1 mA, data a3, next in the order, are operated on the sub-line 2 by LED current of 2 mA, the next data a2 are operated on the sub-line 3 by LED current of 4 mA and the MSB data a1 are operated on the sub-line 4 by LED current of 8 mA. Accumulation of LED currents on each sub-line makes 16 currents from 0 mA to 15 mA with 1 mA interval. As a result, 16 gray scales are achieved.

FIGS. 14 and 15 show a variation which further divides a sub-line into three micro lines. For each micro line, a strobe signal of different width is applied in order to achieve higher resolution. In this variation, the LED head processes the bit slice of print data.

Modified part of the circuit is indicated in FIG. 14. All the other parts are identical to those of FIG. 10. 120 in FIG. 14 is a new control circuit which divides a sub-line into three micro lines and generates a strobe signal of appropriate width for each micro line. The width of a strobe signal is, for example, relative value 1 for the micro line 1, 2 for the micro line 2, and 4 for the micro line 3. A shift register of 192×3 bits, for example, can be employed for the shift register 122 which receives print data from the printer in 3 bits parallel by the frequency of 8 MHz.

FIG. 15 shows the operation of the variation. The printer simultaneously inputs the print data for the 3 micro lines in 3 bits parallel. Input is implemented in due order from the sub-line 1 of the LSB, then the sub-line 2, the sub-line 3, and the sub-line 4 of the MSB. The control circuit 120 generates a latch signal for each micro line. On the micro line 1, data of 1st to 64th addresses of the LSBs in the shift register 122 are latched to the latch circuit 6. On the micro line 2, data of 65th to 128th addresses of the middle bits in the register 122 are latched to the circuit 6. On the micro line 3, data of 129th to 192nd addresses of the MSBs in the register 122 are latched to the circuit 6.

The width of a strobe signal for each micro line is, for example, width of 8 clocks for the micro line 1, width of 16 clocks for the micro line 2, and width of 32 clocks for the micro line 3. As the number of clocks for a sub-line is 64, the remaining 8 clocks are to be used for switching signals. The multiplexer 102 is operated in the same manner as in the embodiment shown in FIG. 10. On the sub-line 1, the multiplexer 102 controls the constant current circuits B1 to B64 end the constant current of 1 mA is output for every micro line. Accordingly, 2 mA current is output for the sub-line 2, 4 mA current for the sub-line 3, and 8 mA current for the sub-line 4.

As each micro line has different print data, printing of 7 gray scales of 1, 2, 3, 4, 5, 6 and 7 can be achieved by changing the width of a strobe time in a sub-line. By combining it with the printing of 15 gray scales implemented in 4 sub-lines 1 to 4, printing of 105 gray scales can be accomplished.

FIG. 16 illustrates the operating characteristics of the power supply 8. In the figure, the abscissa indicates voltage outputs and the ordinate indicates current outputs of each constant current circuit B1 to B64. The current determining resistance is varied from 100 KΩ to 280 KΩ in the figure, and respective change of the current output is illustrated. As is demonstrated in the figure, the outputs of the constant current circuits B1 through B64 vary in accordance with the value of the current determining resistances R1 through R4. By switching the resistances with the multiplexer 102, it becomes possible to change the current outputs in the power supply 8. Moreover, the multiplexer 102 is capable of switching the current determining resistances in high speed and in simple manner. These advantages can be well reflected in the ongoing speedup of printers.

[Embodiment 7]

FIG. 17 illustrates the embodiment which realizes the printing of 256 gray scales. 130 in the figure is a new control circuit. 132 is a shift register for input buffer from the printer. The shift register 132 may be provided, if necessary. 134 is a shift register of 64 bits. 136 is a latch circuit of 64 bits. A101 through A164 are AND gates for the less significant 4 bits. 138 is a constant current power supply. 102 is the aforementioned multiplexer which determines the current outputs for the more significant 4 bits by switching the current determining resistances R1 to R4. 142 is a new multiplexer which determines the current outputs for the less significant 4 bits by switching the current determining resistances R5 to R8. 144 is a data bus which combines the current outputs from both the power supplies 8 and 138 and provides them to the LED arrays L1 through L40. 146 is a new block select circuit.

The operation of the embodiment will be described with reference to FIG. 17. The printer (not shown in the figure) transfers gray scale data and print data which indicate whether each dot should be printed or not. A line is printed in 4 divided sub-lines and the degree of gray scale is allocated to each one of them. At the same time, for each sub-line, the current outputs from both the power supply 8 (for the more significant data) and the power supply 138 (for the less significant data) are combined. The current outputs of the power supplies 8 and 138 are switched by the multiplexers 102 and 142 respectively for every sub-line. Vertical scan control signals from the printer are used for the switching. As a result, two outputs, one of which is the output corresponding to the degree of gray scale designated by the multiplexer 102 and the other is the one designated by the multiplexer 142, are combined in each sub-line. The print data are assigned per each sub-line for both the power supplies 8 and 138 separately. Thus, requisite data for each sub-line are the gray scale data to be sent to the multiplexers 102 and 142 and 128 (64×2) print data.

In the embodiment, the printing of 256 gray scales of 8 bits data is implemented. Supposing that the data are (a1, a2, a3, a4, a5, a6, a7, a8) with a1 in the MSB side and a8 in the LSB side, the more significant 4 bits (a1, a2, a3, a4) are processed by the power supply 8 and the less significant 4 bits (a5, a6, a7, a8) are processed by the power supply 138. Then, for example, on the sub-line 1, data (a1, a5) are processed and the multiplexer 102 selects the current output for data a1 and the multiplexer 142 selects the current output for data a5. Likewise, data (a2, a6) are processed on the sub-line 2, data (a3, a7) are processed on the sub-line 3, and data (a4, a8) are processed on the sub-line 4. As the print data are assigned for each sub-line per each dot for both the power supplies 8 and 138 separately, the printing of 256 gray scales of 8 bits, in total, can be realized.

This embodiment can be achieved by adding the multiplexer 142, the shift register 134, the latch circuit 136 and the constant current power supply 138 to the embodiment of 16 gray scales shown in FIGS. 10 through 13. The multiplexer 102 processes 16 gray scales of the more significant 4 bits, and the multiplexer 142 processes the less significant 4 bits in order to accomplish the printing of 256 gray scales. For this purpose, the current outputs from both the power supplies 8 and 138 are combined.

[Embodiment 9]

Figure 10:
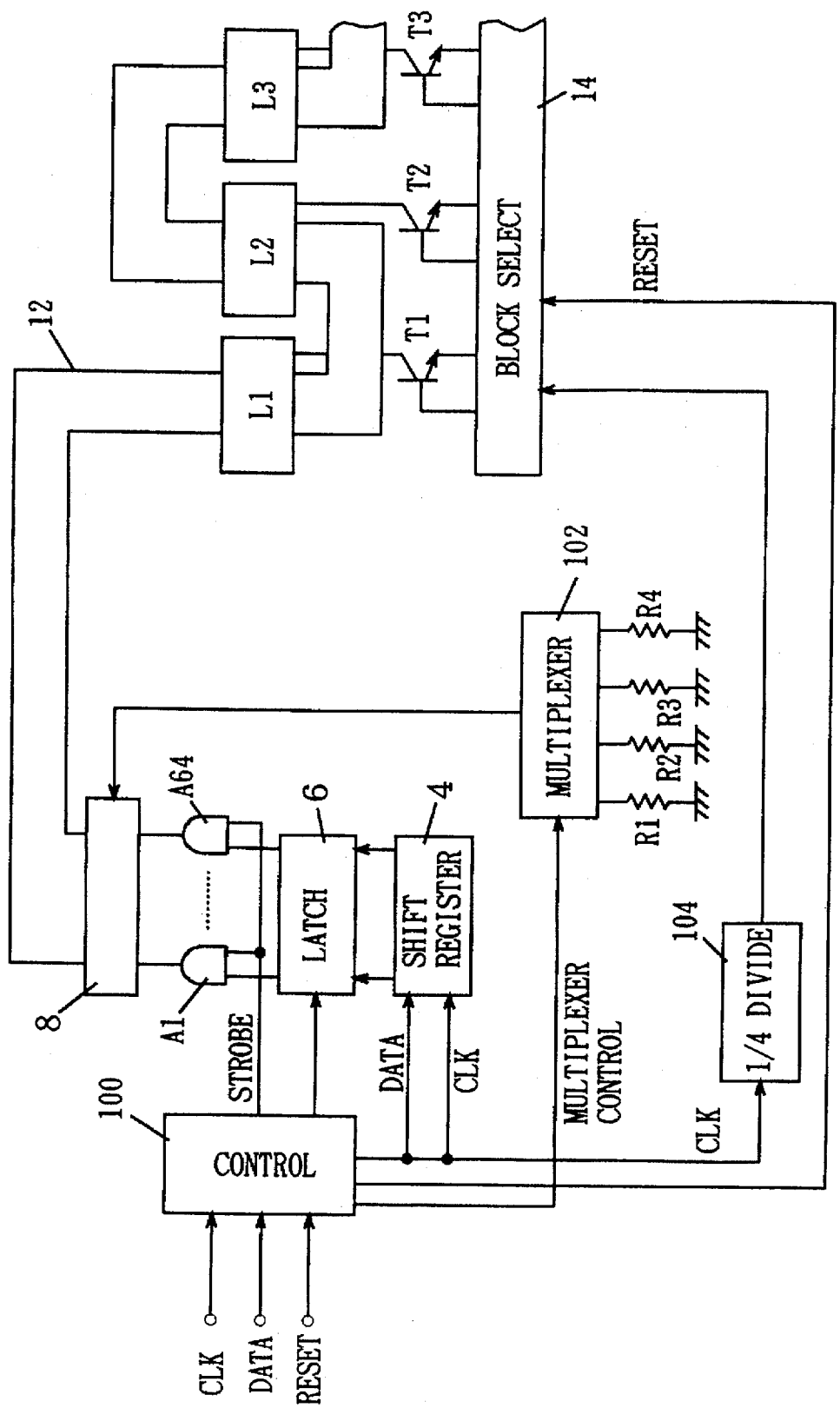
FIG. 10 is a block diagram of an LED head which implements gray scale printing by dividing a printing line into 4 sub-lines and assigning the appropriate current determining resistance for each of them with a multiplexer.

FIG. 18 shows the ninth embodiment. 150 in the figure is a new control circuit. 152 is a new multiplexer of 3 channels. In this embodiment, the LED head shown in FIG. 1 and that of FIG. 10 are integrated so that the output dispersions of LED arrays L1 through L40 can be adjusted and at the same time the printing of 16 gray scales can be accomplished. The control circuit 150 controls the LED head in order to divide a printing line into 4 sub-lines. The multiplexer 10 is applied for the sub-line of MSB and adjusts the output dispersions by switching the current determining resistances R01 to R040 for each LED array L1 to L40. The multiplexer 152 is applied for the less significant 3 sub-lines and implements the printing of 3 bits gray scales by switching the current determining resistances R1 to R3 for each sub-line. The degree of gray scale in total is 16 gray scales of 4 bits (3 bits+1 bit). As is mentioned above, the adjustment of output dispersions is conducted only for 1 bit of the MSB.

It should be understood that the present invention is not limited to the specific embodiments described in this specification. For instance, although the embodiments are described using LED heads as examples, thermal heads can also be applied to the embodiments. In such a case, LED arrays L1 to L40 are replaced by the arrays of thermal modules. In the case of liquid crystal shutter array heads, LED arrays L1 to L40 are replaced by liquid crystal shutter arrays and the constant current power supply 8 is also replaced by a constant voltage power supply for the constant voltage operation. In the embodiments, the time sharing operation is employed. However, static operation may also be employed.

I claim:

1. A print head comprising:

a plurality of image blocks, each of said image blocks including a plurality of image formation modules, a driving circuit for driving said plurality of image blocks, one block at a time, block select means for connecting said plurality of image blocks with said driving circuit, block by block, in a first, predetermined order, a plurality of resistances for determining the output of said driving circuit, said plurality of resistances being connectable to said driving circuit in any one of a plurality of different resistance configurations so that each of the configurations determines a respectively different driving circuit output, and switching means for connecting said resistances to the driving circuit in successive ones of said different resistance configurations in a second predetermined order, one of the resistance configurations being connected to the driving circuit during driving of one image block, and each of the connected resistance configurations reducing differences between image formation module outputs from one block to another.

2. A print head as set forth in claim 1 wherein said switching means comprises a multiplexer.

3. A print head as set forth in claim 1 wherein said driving circuit comprises a plurality of constant current circuits equal in number to said plurality of image formation modules in each of said image blocks.

4. A print head as set forth in claim 1 wherein said image formation modules comprises LEDs.

5. A print head as set forth in claim 2 wherein said plurality of resistance is equal in number to said plurality of image blocks.

6. A print head as set forth in claim 5 wherein said block select means have an output providing a control signal representing the first predetermined order and said output is connected to said multiplexer for controlling said multiplexer based on the control signal in order to connect said resistances to the driving circuit in accordance with the first predetermined order of connection of the image blocks, whereby the second predetermined order is identical to the first predetermined order.

7. A print head as set forth in claim 2 wherein:

said image blocks include a number of normal blocks having outputs in a predetermined range and a number of abnormal blocks having outputs beyond the predetermined range, and said resistances comprise at least one resistance for the normal blocks and a number of resistances for the abnormal blocks equal to the number of the abnormal blocks.

8. A print head as set forth in claim 7 further comprising, a means for generating output signals when detecting that one of the image blocks to be connected to the driving circuit changes from one of the normal blocks to one of the abnormal blocks and vice versa, and wherein said output signals are input into the multiplexer for changing the resistances connected to the driving circuit.

9. A print head as set forth in claim 7 further comprising:

a means for generating abnormal block operating signals when detecting that one of the image blocks to be connected to the driving circuit is one of the abnormal blocks, and wherein the multiplexer connects one of the resistances for the abnormal blocks to the to the driving circuit in response to the abnormal block operating signals, otherwise the multiplexer connects the resistance for normal blocks to the driving circuit.

10. A print head as set forth in claim 2 wherein:

said block select means comprises a plurality of switching transistors connected to each of the image blocks, said print head further comprises a means for detecting a printing ratio of each of the image blocks by the voltage on said switching transistors, and wherein said switching means switches said resistances in accordance with the signals of said printing ratio detect means.

11. A print head for printing an image, the image being composed of a succession of horizontal lines, each of said horizontal lines being divided into a plurality of sub-lines, which are offset from one another in a vertical scanning direction, said print head comprising:

printing means having a plurality of image formation modules, arranged parallel to the horizontal line, for printing the plurality of sub-lines of each line in sequence, print data providing means for providing print data for each one of said image formation modules individually for each of said sub-lines, means for generating multiplexer control signals representing the sequence of printing of the sub-lines of each line, a driving signal generating circuit coupled to said print data providing means and said printing means for providing each one of said image formation modules with driving signals that turn on/off according to said print data, the driving signals for each line having a magnitude, and switch means for controlling the driving signal generating circuit to change the magnitude of the driving signals during printing of each one of said sub-lines for each of said sub-lines, said switch means including a multiplexer connected to a plurality of resistances to receive the multiplexer control signals and operative in response to the multiplexer control signals for changing an individual resistance configuration for each of said sub-lines.

12. A print head as set forth in claim 11 wherein said image formation modules comprise LEDs.

13. A print head as set forth in claim 12 wherein;

each one of said sub-lines is divided into a plurality of micro lines, the driving signal generating circuit provides the driving signal whose magnitude is constant in a sub-line for every micro line, and the print data providing means generates individual data for each one of said micro lines.

14. A print head as set forth in claim 12 further comprising:

a plurality of said driving signal generating circuits, and wherein the print data providing means provides each driving signal generating circuit with individual print data, and said plurality of driving signal generating circuits have outputs which are connected together so that the driving signals from said plurality of driving signal generating circuits are combined and provided to each LED of said printing means.

* * * * *